(12) United States Patent
Beech et al.

(10) Patent No.: US 6,947,741 B2
(45) Date of Patent: Sep. 20, 2005

(54) SATELLITE UP-LINK FADE CONTROL

(75) Inventors: Brian Herbert Beech, Bishopstoke (GB); David G. Edwards, Eastleigh (GB)

(73) Assignee: Tandberg Television ASA, Lysaker (NO)

(*) Notice: Subject to any disclaimer, the term of this patent is extended or adjusted under 35 U.S.C. 154(b) by 448 days.

(21) Appl. No.: 10/131,696

(22) Filed: Apr. 24, 2002

(65) Prior Publication Data

US 2002/0160795 A1 Oct. 31, 2002

(30) Foreign Application Priority Data

Apr. 27, 2001 (GB) ............................................. 0110412

(51) Int. Cl.[7] .................................................. H04Q 7/20
(52) U.S. Cl. ..................... 455/430; 455/13.4; 455/63.1; 375/298
(58) Field of Search ............................... 455/430, 13.4, 455/63.1, 69–70, 12.1, 427, 505, 501; 375/298, 278, 296, 297

(56) References Cited

U.S. PATENT DOCUMENTS

| | | |
|---|---|---|
| 4,752,967 A | 6/1988 | Bustamante et al. |
| 6,072,364 A | 6/2000 | Jeckeln et al. |

FOREIGN PATENT DOCUMENTS

| | | |
|---|---|---|
| WO | WO 98/28888 A | 2/1998 |
| WO | WO 98/45964 | 10/1998 |
| WO | WO 00/01065 A | 6/2000 |

OTHER PUBLICATIONS

WO 98/45964, Fleming et al, Methods and Apparatus for Controlling Earth–Station Transmitted Power in a VSAT Network. International Publication Date: Oct. 15, 1998.*
WO 00/25495, Beech et al, Method and Apparatus for Reducing Distortion of Digital Data. International Publication Date: May 4, 2000.*

* cited by examiner

*Primary Examiner*—Sonny Trinh
*Assistant Examiner*—Phuoc Doan
(74) *Attorney, Agent, or Firm*—Timothy J. Keefer; Seyfarth Shaw LLP

(57) ABSTRACT

A method up-link fade control for a satellite not having AGC, includes the steps of determining characteristics for correcting channel non-linearity, each characteristic being determined for a different value of up-link fade. A signal representative of up-link fade is determined by a beacon receiver and the signal is associated with a correction characteristic for the up-link fade. The correction characteristic associated with the signal is applied to a corrector of a modulator such that the corrector changes the modulator characteristics to modify constellation parameters at a satellite receiver.

62 Claims, 4 Drawing Sheets

SATELLITE UP-LINK FADE CONTROL

BACKGROUND OF THE INVENTION

1) Field of the Invention

This invention relates to satellite up-link fade control.

2) Description of the Related Art

In a digital data transmission channel link, particularly a satellite transmission channel link, it is known for modulation techniques to use symbols arranged as points in a particular constellation pattern to represent digital data. The constellation shows all possible combinations of complex (I and Q) samples of the data being transmitted and the constellation pattern is an overlay of all possible positions of each data sample at a particular point. Thus, for each symbol, we may have four sampling points. Typical techniques are those of phase shift keying (PSK) and quadrature amplitude modulation (QAM). Common techniques are quadrature phase shift keying (QPSK) which is used for digital satellite transmission for consumer TV applications, and 8 PSK which is used, for example, for satellite news gathering applications. It is a desire to utilise higher order modulation methods such as 16 PSK and 16 QAM to permit transmission at a higher bit rate so as to facilitate a greater number of channels to be carried within a predefined bandwidth of a particular transmission link.

Figure 1:
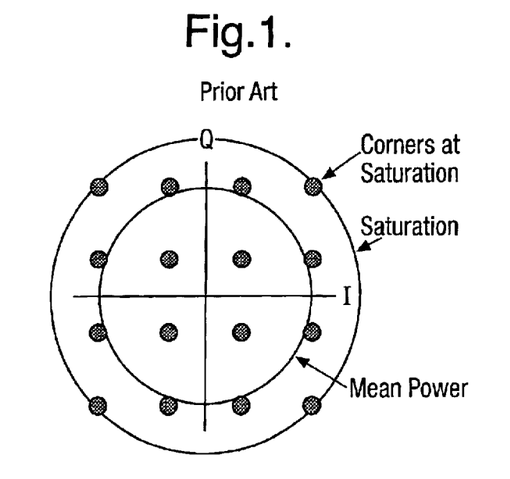
FIG. 1 shows a constellation diagram with "corners at saturation" for 16 QAM.

For 16 QAM operation, the highest drive level which can be used practically for a peak power limited satellite channel is that which forces the satellite transponder to saturation at the corners of the 16 QAM constellation, and such a constellation diagram is shown in FIG. 1 having axes I and Q. It is desirable to allow the satellite transponder to operate at, or very close to, saturation and such operation is known as "corners at saturation" operation.

As is well known, transmission of a modulated signal through a transmission channel such as a terrestrial link, cable or satellite results in distortion of the signal. The distortion is due, at least in part, to non-linear effects upon a signal as it passes through the transmission link. The distortion, in terms of magnitude and/or phase, results in a change in location of the constellation points for any given modulation scheme and an increase in the order of modulation results in a decrease in the distance between constellation points, thereby leading to distortion having a greater effect. Such distortion has the disadvantage of producing errors in demodulation.

It is known to compensate for such non-linear distortion effects within transmission links by use of a pre-correction compensator. Signal pre-distortion performed at radio frequencies (RF), intermediate frequencies (IF) or base band frequencies is often carried out by application of an inverse function of the distortion to be expected of the signal in the transmission path. Such pre-distortion is disclosed in WO-A-95132561 and U.S. Pat. No. 4,992,754. Such forms of pre-correction tend to generate out-of-band components which are passed through to amplifiers in the transmission channel. Where the amplifier has an input filter, as is common for amplifiers used in satellite transmission links, then these out-of-band components are usually filtered out prior to amplification. Thus, the input signal to the amplifier is not the entire signal. This means that pre-correction is not effective for correction of amplifiers contained within satellite transponders where the bandwidth of the incoming signal is high in relation to the bandwidth of the transponder. Further, for higher order modulation schemes, such a form of pre-correction requires very high clocking rates in order to generate the wide-band pre-distortion components.

The foregoing problems are at least partially mitigated by the apparatus disclosed in WO-A-0025495, which discloses an arrangement for pre-distorting a signal so as to offset later distortion of the signal during transmission across a satellite transmission link which contains root Nyquist bandpass filters in respective up and down links. The apparatus includes a plurality of identical pre-distorting stages each of which generates an approximation of the required pre-distortion. Each successive stage receives an approximation from the preceding stage so that errors in successive approximations converge towards zero with increase in the number of stages.

The use of dynamic pre-correction requires that the operating point of the transmitter high power amplifier and of the satellite transponder is stable because the required correction is dependent upon the operating point. Some satellite transponders include automatic gain control (AGC) which maintains a constant drive level to the satellite power amplifier irrespective of the signal level at the input to the satellite. As a result, the only effect of an up-link fade is that the up-link carrier to noise ratio is worsened. However, many satellites do not have AGC and the present invention seeks to provide an up-link fade control system for satellite transponders not having AGC.

SUMMARY OF THE INVENTION

According to a first aspect of this invention there is provided a method of providing up-link fade control for a satellite not having AGC, said up-link having a modulator in a transmitting station, including the steps of determining plural characteristics for correcting channel non-linearity, each characteristic being determined for a different value of up-link fade, determining a signal representative of up-link fade by beacon receiver means, associating said signal with a correction characteristic for said up-link fade, applying said correction characteristic associated with said signal to corrector means of said modulator, whereby said corrector means changes the modulator characteristics to modify constellation parameters at a satellite receiver.

In one embodiment, said step of determining plural characteristics includes the steps of detecting the received constellation parameters with the satellite operating at substantially saturation level, calculating correction parameters for various values of satellite input back-off corresponding to values of up-link fade and storing said characteristics.

Preferably, said characteristics are stored in store means at said transmitting station.

Alternatively, said characteristics are stored at a receiving station which includes a satellite receiver demodulator coupled with display means for displaying the receiver constellation characteristics, and processor means for storing said plural characteristics and to select one of said characteristics for correcting said receiver constellation in dependence upon up-link fade, said processor means being coupled with said transmitter modulator to apply correction to the modulator to correct the received constellation parameters.

Conveniently, the increments of satellite back-off are non-linear, although in another embodiment they may be linear if desired.

Advantageously, the processor means is connected to said modulator by a digital communication channel.

Advantageously, the signal representative of up-link fade is determined by beacon receiver means which is polled such that, as the up-link fades, so a revised characteristics is used to modify the modulator so that the constellation parameters at the receiver are maintained substantially undistorted.

Preferably, the corrector means performs dynamic pre-correction by pre-distorting a signal which has been modulated to carry signals representative of digital data so as to reduce non-linear distortion in a signal channel containing root Nyquist bandpass filters in transmission and reception portions of said channel, there being provided a series connection of a static pre-distortion section configured to represent an inverse function of magnitude and phase distortion estimated to occur in said channel, and at least one dynamic pre-distortion section, the or each dynamic pre-distorting section including a forward model configured to represent magnitude and phase distortion in said channel, said signal being passed through cascaded sections whereby each successive dynamic pre-distorting section receives input from an output of a preceding dynamic pre-distorting section so that distortion in said channel is successively reduced to zero with each successive dynamic pre-distorting section.

In a preferred embodiment, said channel includes a satellite having a cascaded input multiplexer filter, a power amplifier and an output multiplexer filter, and said forward model further comprises a model of magnitude response of said input multiplexer filter and output multiplexer filter, whereby magnitude response of said channel may be corrected.

Advantageously, said dynamic pre-distorting sections are substantially identical to one another.

In a preferred embodiment, said forward model comprises a series connection of an up-sampler, a model representative of magnitude and phase of:

a transmission side root Nyquist filter;
a transmission side high power amplifier;
a satellite input multiplexer filter;
a satellite power amplifier;
a satellite output multiplexer filter;
a receiver side root Nyquist filter; and a down-sampler.

Conveniently, said power amplifier is one of a travelling wave and a solid state power amplifier.

Advantageously, said signal is modulated in accordance with one of 16 QAM, 32 QAM, 8 PSK and 16 PSK.

According to a further aspect of this invention there is provided apparatus for performing the method of said first aspect of this invention.

BRIEF DESCRIPTION OF THE DRAWINGS

The invention will now be described, by way of example, with reference to the accompanying drawings in which.

In the Figures like reference numerals denote like parts.

DESCRIPTION OF THE PREFERRED EMBODIMENTS

Figure 2:
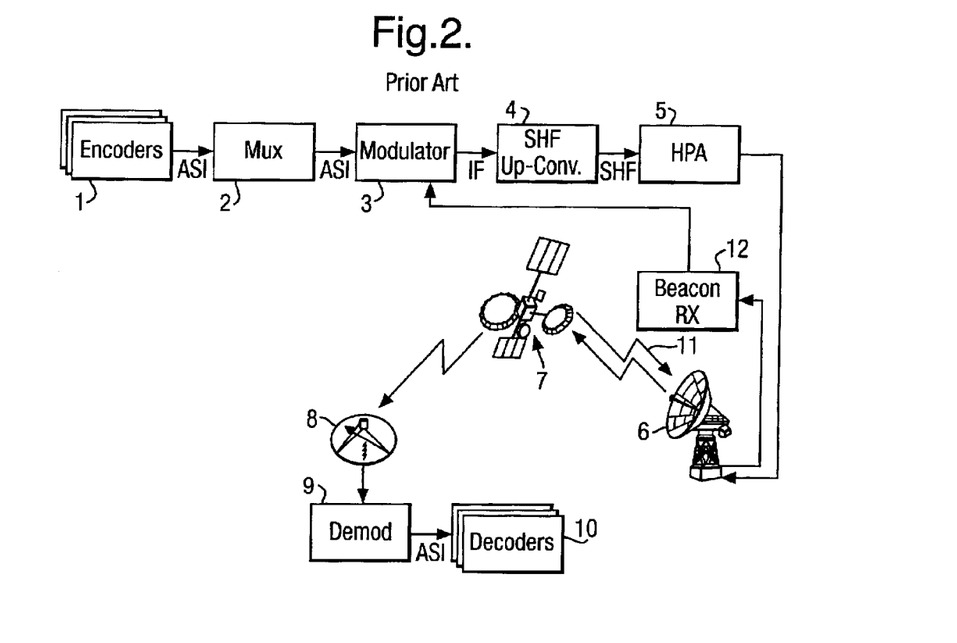
FIG. 2 shows a known satellite transmission system in which up-link power control is used to reduce the effects of up-link fade.

An exemplary known satellite system having power control for a satellite transponder not having AGC is shown in FIG. 2. In the system, plural encoders 1 provide input to a multiplexer 2 through an asynchronous serial interface (not shown) and the multiplexer 2 provides input to a modulator 3, also through an asynchronous serial interface (not shown). The modulator 3 provides an intermediate frequency output to a super high frequency up converter 4 which provides output to a high power amplifier 5, output of which is transmitted by, for example, a parabolic dish 6 to a satellite 7. The satellite re-transmits the received signal to a receiving satellite dish 8 and the received signal is demodulated by a demodulator 9 and applied to one or more decoders 10. The satellite also transmits a beacon signal 11 which may be received by the dish 6 and applied to a beacon receiver 12. The beacon receiver 12 is connected to provide a gain control input to the modulator 3.

In a system there may be several modulators applying signals to a satellite dish and, similarly, there may be plural beacon receivers each receiving a beacon signal from the satellite and the beacon signals may be unmodulated or modulated with telemetry information.

The frequency of the beacon signal is different to the signal transmitted from the dish 6 to the satellite and, as a result, the attenuation of the up-link signal and of the beacon signal due to fade will be different from one another.

The beacon receiver produces an output to the modulator which is dependent upon the beacon signal level. Thus, when an up-link fade condition exists, the level of the up-link signal received by the satellite from the high power amplifier will reduce. The signal level received by the beacon receiver will also reduce by a corresponding amount.

Figure 3:
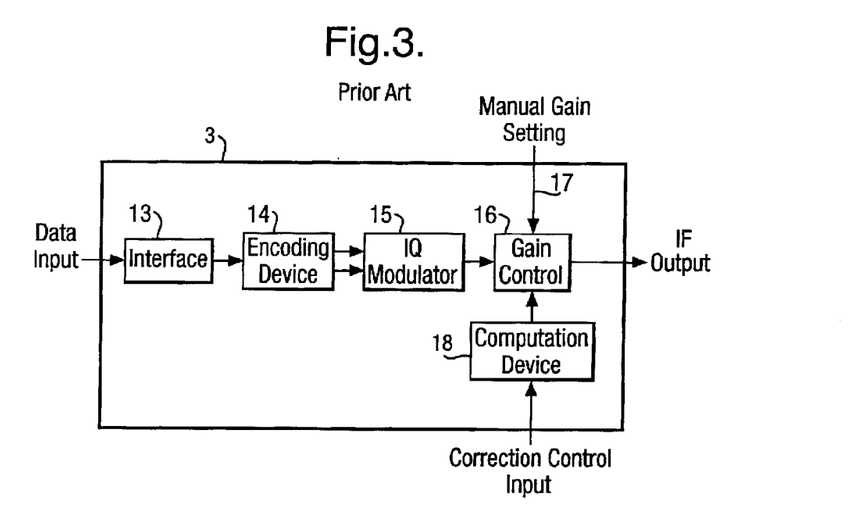
FIG. 3 shows, in block schematic form, a prior art modulator for the system of FIG. 2.

The modulator 3 is shown in greater detail in FIG. 3 in which data input from the multiplexer 2 is applied to, for example, an asynchronous serial interface 13 and thence to an encoding device 14 and an IQ modulator 15. Output from the modulator 15 is applied to a gain control circuit 16 receiving inputs from a manual gain setting 17 and a computation device 18. The manual gain setting 17 is used to control the gain of the modulator output when the modulator is initially set up. The computation device 18 receives gain control input from the beacon receiver 12 and because the frequencies of the up-link signal and the beacon signal are different from one another, so the computation device 18 performs a mathematical computation based upon the values of the two different frequencies which, it will be remembered, suffer differing attenuation, to determine the correct amount of gain control to be applied to the signal to be transmitted.

The problem with such a prior art system is that the maximum up-link fade which can be corrected is equal to the excess power which is available in the high power amplifier 5. For 16 QAM systems operating at a high bit rate, a high equivalent isotropic radiated power is generally required for even clear sky conditions. Therefore, in many cases, the use of up-link power control may be impractical due to insufficient power. As an example, the transmission power may be 1 Kw, but if there is 10 dB attenuation (i.e. fade), then the transmitted power would need to increase to 10 Kw. However, the maximum power of present day travelling wave tubes, or klystrons, is typically 2 Kw.

The present invention provides an alternative to up-link power control and does not require a large excess power to be available in the high power amplifier.

Figure 4:
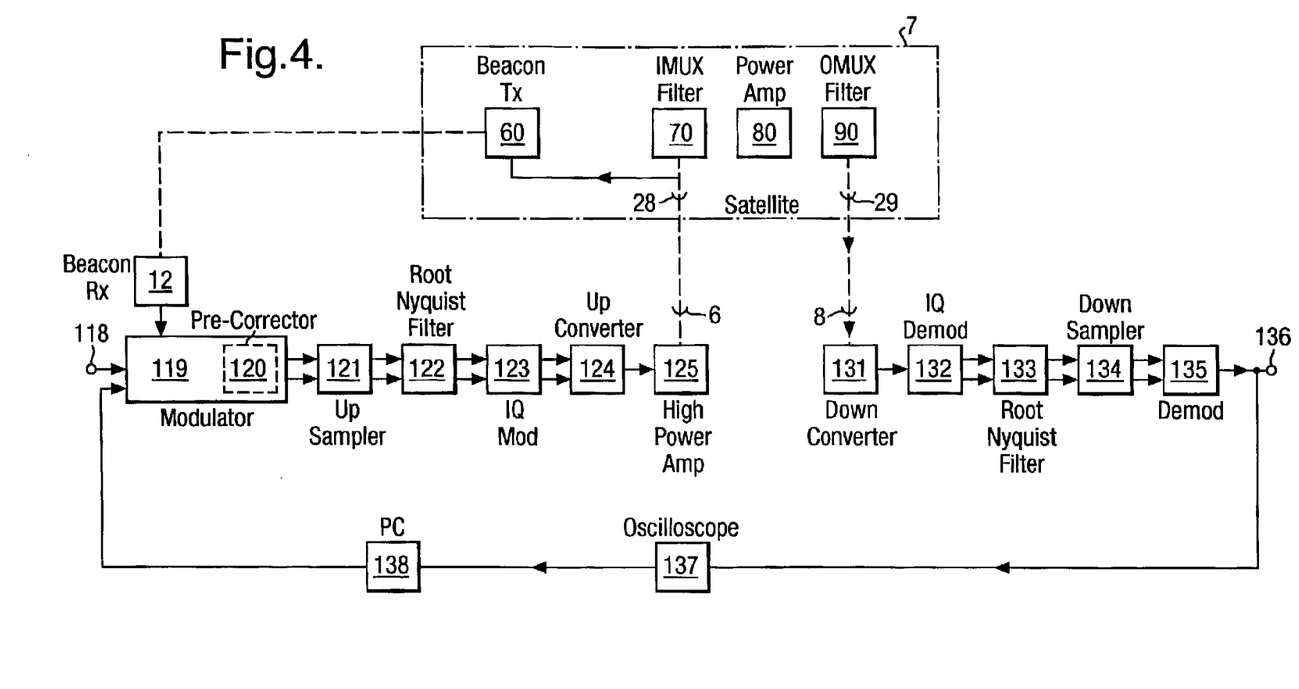
FIG. 4 shows, in block schematic form, a satellite transmission apparatus in accordance with the present invention.

A satellite communication link of this invention will now be described with reference to FIG. 4. The transmitter side has a modulator 119 including a pre-corrector 120, the modulator having an input 118 for receiving a stream of data bits and the modulator produces complex, I and Q, modulated outputs. The pre-corrector will be described in detail hereinafter with reference to FIG. 6. Output from the modulator is applied to an up sampler 121 which multiplies the input bit rate by a factor of 2 or more so as to provide a required output facilitating operation of a root Nyquist filter 122, which is usually a bandpass filter. It is usual to use Nyquist filtering within a transmission link in order to constrain the bandwidth of the transmitted signal. Output from the filter 122 is applied to an I, Q modulator 123 which provides an output to an up-converter 124, output of which is applied to a high power amplifier 125 and then transmitted by, for example, the parabolic dish 6 to a satellite 7.

The satellite 7 has a receiving antenna 28 applying a signal to an input multiplexer (IMUX) filter 70, thence to a power amplifier 80 and an output multiplexer (OMUX) filter 90. Output from the OMUX filter is applied to a transmitting antenna 29 and a signal is received by, for example, the parabolic dish 8 at a receiver side.

An output R.F. signal from the dish 8 is applied to a down converter 131. Output from the down converter 131 is applied to an I, Q demodulator 132 which, in turn, provides output to a root Nyquist band pass filter 133. The output of the filter 133 is applied to down-sampler 134 and the I, Q down sampled outputs are demodulated by demodulator 135 to provide digital data transmitted by the symbols within the modulation scheme and provide an IQ output at output terminal 136.

Output from the demodulator is applied to an oscilloscope 137 which is connected to a processor such as a personal computer 138 which is connected over a transmission path to the modulator 119.

The satellite includes a beacon transmitter 60 which transmits signal representative of the up-link attenuation (fade) to the beacon receiver 12 connected to provide a correction controlling input to the modulator 119. The beacon receiver 12 may be connected to the modulator 119 by a digital communication port, e.g. an RS232 port or, alternatively, the beacon receiver may be arranged to generate an analogue signal which is level-dependent and which is fed to the modulator via an analogue/digital converter.

The principle upon which the present invention is based is that when an up-link fade occurs, the received up-link signal at the satellite is allowed to fade, but the correction parameters of the modulator are changed so that the constellation parameters of the receiver remain substantially undistorted. Under clear sky conditions, the satellite transponder operates at, or very close to, saturation, which means that up-link fades will produce a down-link fade which is substantially smaller. As an example, for a satellite transponder using a travelling wave tube (TWT) power amplifier, an up-link of 3 dB will produce a corresponding down-link fade of only 1.25 dB. In distinction, some prior art systems operate the satellite with significant back-off, which means that a 3 dB up-link fade produces approximately a 3 dB down-link fade.

Figure 5:
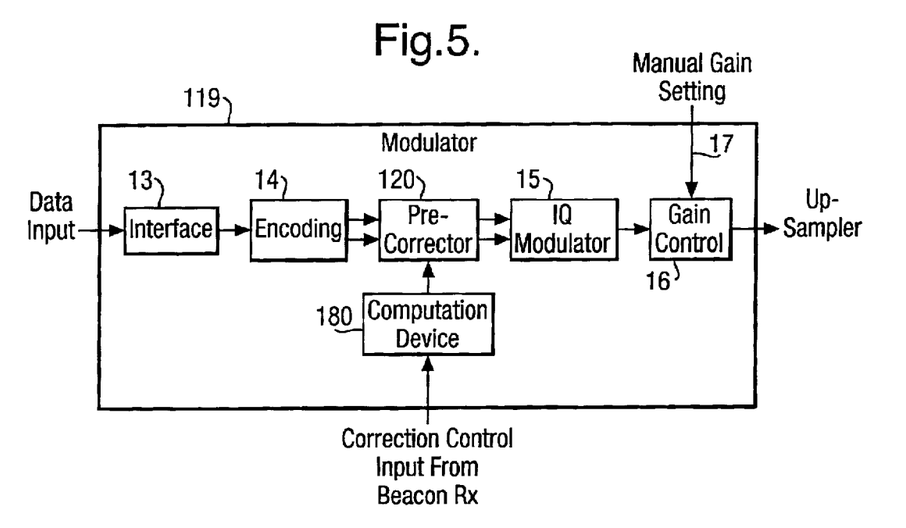
FIG. 5 shows a modulator used in this invention.

The modulator 119 is shown in FIG. 5 having, inter alia, a computation device 180 applying signals to the pre-corrector 120.

Figure 6:
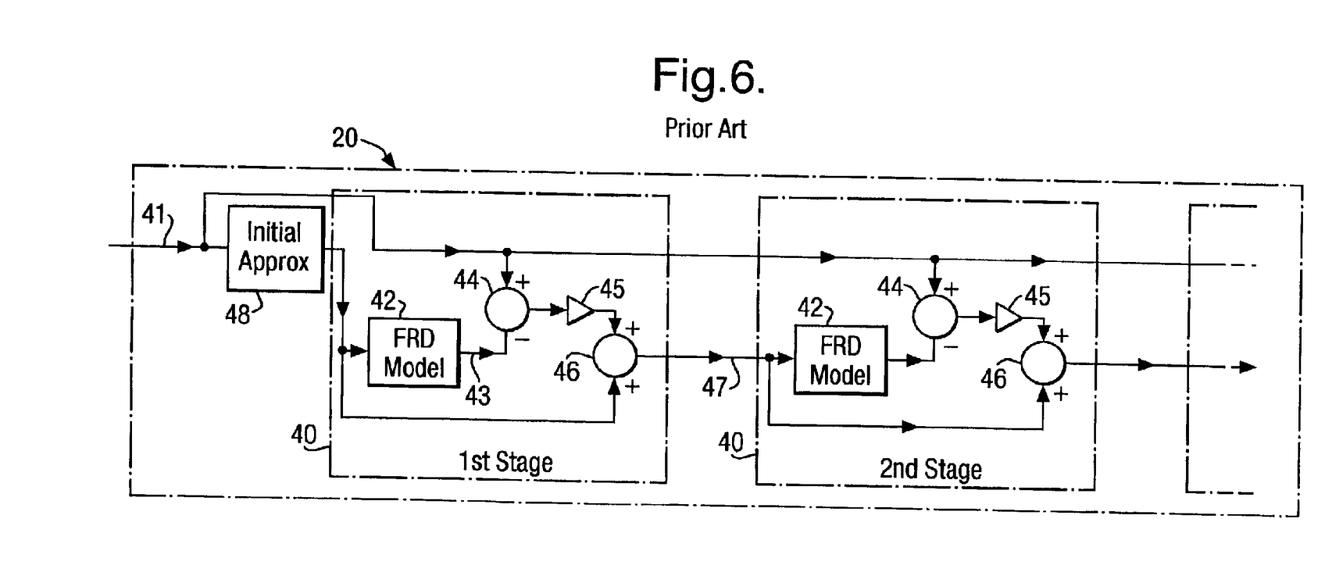
FIG. 6 shows a dynamic pre-corrector used in this invention.

The pre-corrector 120 shown in FIG. 6, has an input signal Vi on line 41, although shown as a single signal input line, is a complex signal representative of magnitude and phase and, similarly, output from the pre-corrector is also a complex, I, Q signal. It will be understood by those skilled in the art that the inputs and outputs may be Cartesian or in polar form.

The input signal Vi is applied to an initial approximation approximator 48 in input line 41 which is arranged to provide an output which is approximately the inverse of the distorting function of a forward model 42. For pre-distortion of an amplifier such as a TWT or solid state power amplifier, the initial approximator 48 may be a function which places the constellation points in the correct place for pre-distortion but which does not dynamically change their position from symbol to symbol. Such an initial approximator is known in the art as a static pre-distorter. Such a static pre-distorter may comprise equal and opposite pre-distorters for distortion in the channel caused by non-linearity and group delay. The initial approximator disclosed in WO-A-0025495 produces an approximation of the non-linear distortion within the satellite. For combined non-linear and group delay correction, the approximator 48 may be a known non-linear corrector cascaded with a conventional group delay corrector.

Output from approximator 48 is applied to an input of the forward model 42 which is a pre-calculated forward model representative of the satellite transmission/reception channel from the input of the up sampler 21 to the output of the down sampler 34. It will be understood that the forward model is based upon the linear and non-linear transfer function f of the channel. Output 43 of the forward model is applied to one input of a subtractor 44, the other input of which is supplied from input line 41. The input to the subtractor 44 from line 41 is delayed by a delay (not shown) to provide delayed symbols representative of digital data for time=t(1) so as to align the data with the symbols at time=t(1) that are acted upon by the forward model 42. The subtractor 44 output, which is an error signal given by Vi−f(Vi), is applied to an amplifier 45 and thence to one input of an adder 46, the other input of adder 46 being derived from input line 41 which are delayed by a delay (not shown) representative of the delay through components 42, 44 and 45. The amplification A by amplifier 45 is chosen to achieve the highest convergence rate for a given forward model distorting function.

It will be realised by those skilled in the art that an output 47 of adder 46 provides an estimate of the required transmitted signal and concerns symbols representative of digital data for time=t(1), whereby a first stage of approximation of the input signal pre-corrected for channel distortion is provided which is given by A[Vi−f(Vi)]+Vi. The initial approximator 48 thus forms a static pre-distorting section and the elements 42–46 form a first dynamic pre-distorting stage 40. Because the output 47 of the first, i.e. single stage is not mathematically the required corrected signal, i.e. A[Vi−f(Vi)]+Vi≠Vi, so further dynamic pre-distorting stages 40 are provided which are identical to the first stage 40 so as to provide cascaded, successive stages of pre-distortion, each approximating to the required pre-distortion necessary for correction of the signal at the output 36. It has been found by computer simulation that errors in successive approximations converge toward zero with increase in the number of stages. In the example shown, there are second and further successive, cascaded, stages. It has been found that in the prior art six dynamic pre-distorting stages of successive approximation provides a reasonable balance between convergence towards zero and hardware implementation of the corrector. By using a number of successive stages of approximation, the error converges to zero and the final output becomes the required transmitted signal.

During passage of symbols representative of digital data for time=t(1) through the second stage, the first stage will be supplied with symbols representative of digital data for time=t(1+n), where n represents the pipeline delay.

Initially, to set up the system, typically, firstly magnitude is adjusted and then phase is adjusted. Assuming 16 QAM modulation with the satellite operating at "corners at saturation", i.e. the four outer corners of the constellation shown in FIG. 1 are located with the satellite transponder operating at its saturation point. The constellation diagram of FIG. 1 is displayed on the oscilloscope 137 and the correction parameters of pre-corrector 120 are adjusted to obtain the corners at saturation constellation diagram that is desired.

Using the PC 138, a set out files are generated which each correspond to a characteristic of magnitude and phase to provide correction parameters for different values of satellite input back-off corresponding to values of up-link fade. The values are calculated from the datum parameters obtained by the adjustment derived from the "corners at saturation" operating point. The correction values are arranged to provide a corrected receiver constellation diagram which will be similar to that shown in FIG. 1 irrespective of the amount of satellite input back-off corresponding to up-link fade. Thus, a set of files each corresponding to particular characteristics are generated which correspond to discrete values of satellite back-off and the files that are produced are specific to a particular fade value. The first curve that is produced is for 0 dB attenuation, i.e. produced under clear sky conditions, and the curve characteristic is held in a look-up table, the curve, as stated above, correcting the receiver constellation points. Characteristic curves for different fade conditions are also held in look-up tables so that the constellation points are corrected. An example of the back-off values corresponding to differing fade values may be as follows:

0 dB—clear sky condition
0.5 dB
1.0 dB
1.5 dB
2.0 dB
3.0 dB
4.0 dB
5.0 dB
6.0 dB
7.0 dB
9.0 dB
11.0 dB In order to minimise the total number of back-off value files that are held, the increments of satellite input back-off are non-linear to thereby decrease the size of computer memory that is required. Thus, in the above example, the fade values commence at 0.5 dB values, go through 1 dB values and end in 2 dB increments. If memory capacity is not a limitation, then the incremental fade values used may be linear.

The files that are produced are down-loaded from the PC 138 to the modulator 119. Having set up the various files using the PC and oscilloscope, the PC 138 and oscilloscope 137 may be removed and are no longer required since the files are stored in the modulator 119.

Within the computation device 180 is an algorithm which will select the optimum non-linear correction file based upon the signal level information derived from the beacon receiver 12 providing a correction control input. Thus, if the beacon receiver determines that the up-link fade is, for example, 3 dB, then the file characteristic that was determined at set-up for a 3 dB fade will be loaded from the computation device 180 to the pre-corrector 120. The computation device 180, like the computation device 18, performs a mathematical computation based on the values of up-link frequency and beacon frequency to determine the correct fade file that is required. Data from this file is then loaded into the pre-corrector 120.

Thus, in operation of the invention, output from the beacon receiver is polled so that as the up-link fades, new file selections are made and the pre-corrector modifies the modulator 15 characteristics so that the output constellation, as seen by the receiver 131-135 at the receiving site, is maintained to be substantially undistorted.

It will be understood that the initial set-up procedure must be performed from a site where the down-link beam is visible. This may be either the intended receive site or, if possible, the up-link site. If the set-up is performed remote from the modulator 119, then the communication between the PC 138 and the modulator may be achieved using, for example, the internet ports on the modulator and PC to achieve a connection via the internet.

The foregoing method of operation is desired since to have a PC permanently in the link is considered undesirable because the reliability of a PC cannot be guaranteed.

However, if so desired, it is possible that the PC 138 be retained as part of the operational system. In this event, files stored in the PC may be down-loaded to the modulator in real-time, i.e. "on the fly". In such a system the modulator would poll the PC to obtain the appropriate file required for a particular level of fade, as determined by the beacon receiver signal.

In another embodiment, the generation of files may be performed by the modulator if it has a processor with sufficient computing power so that a PC is not required.

It is to be understood that other modifications could be made and that all such modifications falling within the spirit and scope of the appended claims are intended to be included in the present invention.

We claim:

1. A method of providing up-link fade control to a satellite not having AGC, said up-link having a modulator in a transmitting station, including the steps of:
   (a) determining plural characteristics for correcting channel non-linearity, each characteristic being determined for a different value of up-link fade,
   (b) determining a signal representative of up-link fade by beacon receiver means,
   (c) associating said signal with a correction characteristic for said up-link fade,
   (d) applying said correction characteristic associated with said sign to corrector means of said modulator, wherein said corrector means changes the modulator characteristics to modify constellation parameters at a satellite receiver.

2. A method as claimed in claim 1 wherein said step (a) of determining plural characteristics includes the steps of detecting the received constellation parameters with the satellite operating at substantially saturation level, calculating correction parameters for various values of satellite input back-off corresponding to values of up-link fade and storing said characteristics.

3. A method as claimed in claim 1 wherein said plural characteristics are stored in store means at said transmitting station.

4. A method as claimed in claim 1 wherein said plural characteristics are stored at a receiving station which includes a satellite receiver demodulator coupled with display means for displaying the receiver constellation characteristics, and processor means for storing said plural characteristics and to select one of said characteristics for correcting said receiver constellation in dependence upon up-link fade, said processor means being coupled with said transmitter modulator to apply correction to the modulator to correct the received constellation parameters.

5. A method as claimed in claim 2 wherein the increments of satellite back-off are non-linear.

6. A method as claimed in claim 2 wherein the increments of satellite back-off are linear.

7. A method as claimed in claim 4 wherein the processor means is connected to said modulator by a digital communication channel.

8. A method as claimed in claim 1 wherein the signal representative of up-link fade is determined by beacon receiver means which is polled such that, as the up-link fades, so a revised characteristics is used to modify the modulator so that the constellation parameters at the receiver are maintained substantially undistorted.

9. A method as claimed in claim 1 wherein the corrector means performs dynamic pre-correction by pre-distorting a signal which has been modulated to carry signals representative of digital data so as to reduce non-linear distortion in a signal channel containing root Nyquist bandpass filters in transmission and reception portions of said channel, there being provided a series connection of a static pre-distortion section configured to represent an inverse function of magnitude and phase distortion estimated to occur in said channel, and at least one dynamic pre-distortion section, the or each dynamic pre-distorting section including a forward model configured to represent magnitude and phase distortion in said channel, said signal being passed through cascaded sections whereby each successive dynamic pre-distorting section receives input from an output of a preceding dynamic pre-distorting section so that distortion in said channel is successively reduced to zero with each successive dynamic pre distorting section.

10. A method as claimed claim 9 wherein said channel includes a satellite having a cascaded input multiplexer filter, a power amplifier and an output multiplexer filter, and said forward model further comprises a model of magnitude responds of said input multiplexer filter and output multiplexer filter, whereby magnitude response of said channel may be corrected.

11. A method as claimed in claim 9 wherein said dynamic pre-distorting sections are substantially identical to one another.

12. A method as claimed in claim 9 wherein said forward model comprises a series connection of an up-sampler, a model representative of magnitude and phase of:
  a transmission side root Nyquist filter;
  a transmission side high power amplifier;
  a satellite input multiplexer filter;
  a satellite power amplifier;
  a satellite output multiplexer filter;
  a receiver side root Nyquist filter;
and a down-sampler.

13. A method as claimed in claim 10 wherein said power amplifier is one a travelling wave and a solid state power amplifier.

14. A method as claimed in claim 9 wherein said signal is modulated in accordance with one of 16 QAM, 32 QAM, 8 PSK and 16 PSK.

15. A method of providing up-link fade control to a satellite not having AGC, said up-link having a modulator in a transmitting station, including the steps of determining plural characteristics for correcting channel non-linearity, each characteristic being determined for a different value of up-link fade, determining a signal representative of up-link fade by beacon receiver means, associating said signal with a correction characteristic for said up-link fade, applying said correction characteristic associated with said signal to corrector means of said modulator, wherein said corrector means changes the modulator characteristics to modify constellation parameters at a satellite receiver, and said corrector means performs dynamic pre-correction by pre-distorting a signal which has been modulated to carry signals representative of digital data so as to reduce non-linear distortion in a signal channel containing root Nyquist bandpass filters in transmission and reception portions of said channel, there being provided a series connection of a static pre-distortion section configured to represent an inverse function of magnitude and phase distortion estimated to occur in said channel, and at least one dynamic pre-distortion section, the or each dynamic pre-distorting section including a forward model configured to represent magnitude and phase distortion in said channel, said signal being passed through cascaded sections whereby each successive dynamic pre-distorting section receives input from an output of a preceding dynamic pre-distorting section so that distortion in said channel is successively reduced to zero with each successive dynamic pre-distorting section.

16. A system for providing up-link fade control to a satellite not having AGC, said system including a modulator in a transmitting station of said up-link, means for determining plural characteristics for correcting channel non-linearity, each characteristic being determined for a different value of up-link fade, means for determining signal representative of up-link fade by beacon receiver means, means for associating said signal with a correction characteristic for said up-link fade, and means for applying said correction characteristic associated with said signal to corrector means of said modulator, wherein said corrector means changes the modulator characteristics to modify constellation parameters at a satellite receiver.

17. A system as claimed in claim 16 wherein said means for determining plural characteristics includes means for detecting the received constellation parameters with the satellite operating at substantially saturation level, and means for calculating correction parameters for various values of satellite input back-off corresponding to values of up-link fade and storing said characteristics.

18. A system as claimed in claim 16 wherein said plural characteristics are stored in store means at said transmitting station.

19. A system as claimed in claim 16 wherein said plural characteristics are stored at a receiving station which includes a satellite receiver demodulator coupled with display means for displaying the receiver constellation characteristics, and processor means for storing said plural characteristics and to select one of said characteristics for correcting said receiver constellation in dependence upon up-link fade, said processor means being coupled with said transmitter modulator to apply correction to the modulator to correct the received constellation parameters.

20. A system as claimed in claim 17 wherein the increments of satellite back-off are non-linear.

21. A method as claimed in claim 17 wherein the increments of satellite back-off are linear.

22. A method as claimed in claim 19 wherein the processor means is connected to said modulator by a digital communication channel.

23. A system as claimed in claim 16 wherein the signal representative of up-link fade is determined by beacon receiver means which is polled such that, as the up-link fades, so a revised characteristics is used to modify the modulator so that the constellation parameters at the receiver are maintained substantially undistorted.

24. A system as claimed in claim 16 wherein the corrector means performs dynamic pre-correction by pre-distorting a signal which has been modulated to carry signals representative of digital data so as to reduce non-linear distortion in a signal channel containing root Nyquist bandpass filters in transmission and reception portions of said channel, there being provided a series connection of a static pre-distortion section configured to represent an inverse function of magnitude and phase distortion estimated to occur in said channel, and at least one dynamic pre-distortion section, the or each dynamic pre-distorting section including a forward model configured to represent magnitude and phase distortion in said channel, said signal being passed through cascaded sections whereby each successive dynamic pre-distorting section receives input from an output of a preceding dynamic pre-distorting section so hat distortion in said channel is successively reduced to zero with each successive dynamic pre-distorting section.

25. A system as claimed claim 16 wherein said channel includes a satellite having a cascaded input multiplexer filter, a power amplifier and an output multiplexer filter, and said forward model further comprises a model of magnitude response of said input multiplexer filter and output multiplexer filter, whereby magnitude response of said channel may be corrected.

26. A system as claimed in claim 24 wherein said dynamic pre-distorting sections are substantially identical to one another.

27. A system as claimed in claim 24 wherein said forward model comprises a series connection of an up-sampler, a model representative of magnitude and phase of:
    a transmission side root Nyquist filter;
    a transmission side high power amplifier;
    a satellite input multiplexer filter;
    a satellite power amplifier;
    a satellite output multiplexer filter;
    a receiver side root Nyquist filter;
and a down-sampler.

28. A system as claimed in claim 25 wherein said power amplifier is one of a travelling wave and a solid state power amplifier.

29. A system as claimed in claim 24 wherein said signal is modulated in accordance with one of 16 QAM, 32 QAM, 8 PSK and 16 PSK.

30. A system for providing up-link fade control to a satellite not having AGC, said system including a modulator in a transmitting station of said up-link, means for determining plural characteristics for correcting channel non-linearity, each characteristic being determined for a different value of up-link fade, means for determining a signal representative of up-link fade by beacon receiver means, means for associating said signal with a correction characteristic for said up-link fade, means for applying said correction characteristic associated with said signal to corrector means of said modulator, wherein said corrector means changes the modulator characteristics to modify constellation parameters at a satellite receiver, and said corrector means performs dynamic pre-correction by pre-distorting a signal which has been modulated to carry signals representative of digital data so as to reduce non-linear distortion in a signal channel containing root Nyquist bandpass filters in transmission and reception portions of said channel, there being provided a series connection of static pre-distortion section configured to represent an inverse function of magnitude and phase distortion estimated to occur in said channel, and at least one dynamic pre-distortion section, the or each dynamic pre-distorting section including a forward model configured to represent magnitude and phase distortion in said channel, said signal being passed through cascaded sections whereby each successive dynamic pre-distorting section receives input from an output of a preceding dynamic pre-distorting section so that distortion in said channel is successively reduced to zero with each successive dynamic pre-distorting section.

31. A method of providing up-link fade control to a satellite not having AGC, said up-link having a modulator in a transmitting station, including the steps of:
    (a) determining plural characteristics for correcting channel non-linearity, each characteristic being determined for a different value of up-link fade,
    (b) determining a signal representative of up-link fade by beacon receiver means,
    (c) associating said signal with a correction characteristic for said up-link fade,
    (d) applying said correction characteristic associated with said sign to corrector means of said modulator, wherein the beacon receiver means is polled such that, as the up-link fades, so a revised correction characteristic is used to modify the modulator so that the constellation parameters at a satellite receiver are maintained substantially undistorted.

32. A system for providing up-link fade control to a satellite not having AGO, said system including a modulator in a transmitting station of said up-link, means for determining plural characteristics for correcting channel non-linearity, each characteristic being determined for a different value of up-link fade, means for determining a signal of up-link fade by beacon receiver means, means for associating said signal with a correction characteristic for said up-link fade, and means for applying said correction characteristic associated with said signal to corrector means of said modulator, wherein the signal representative of up-link fade is determined by beacon receiver means which is polled such that, as the up-link fades, so a revised characteristic is used to modify the modulator so that the constellation parameters at the receiver are maintained substantially undistorted.

33. A method of compensating up-link fade in a system having a modulator in a transmitting station, an up-link to a satellite having a transponder not having a AGC, and a down-link from a beacon of the satellite to a receiving station having a beacon receiver, the method including the steps of:
    determining a plurality of characteristics representative of up-link fade values indicated by a signal transmitted from the beacon transmitter of the satellite to the receiving station beacon receiver;
    storing said plurality of characteristics to provide correction parameters for said modulator;
    determining an up-link fade value by said beacon receiver and in dependence thereon selecting a stored characteristic, and
    applying the selected characteristic to a corrector means of said modulator, wherein the modulation of a transmitted signal from the transmitting station is pre-corrected such that the signal received by the receiving station has a constellation pattern that is substantially undistorted by channel non-linearities and up-link fading.

34. A method as claimed in claim 33 wherein said step of determining the plurality of characteristics includes the steps of transmitting a modulated signal from the satellite transponder when it is operating at its saturation point, detecting a constellation pattern of the modulated signal received at the receiving station, determining and storing the modulator correction parameters required to obtain a "corners at saturation" constellation pattern for he received signal, and repeating process for various values of satellite transponder input back-off, which values correspond to values of up-link fade.

35. A method as claimed in claim 33 wherein said characteristics are stored in store means coupled to the modulator at said transmitting station.

36. A method as claimed in claim 33 wherein said characteristics are stored at a receiving station which includes a satellite receiver demodulator coupled with display means for displaying the receiver constellation characteristics, and processor means for storing said plurality of characteristics and to select one of said characteristics for correcting said receiver constellation in dependence upon up-link fade, said processor means being coupled with said transmitter modulator to apply the pre-correction to the modulator to correct the received constellation parameters.

37. A method as claimed in claim 34 wherein the increments of satellite back-off are non-linear.

38. A method as claimed in claim 34 wherein the increments of satellite back-off are linear.

39. A method as claimed in claim 36 wherein the processor means is connected to said modulator by a digital communication channel.

40. A method as claimed in claim 33 wherein the beacon receiver means is polled such that, as the up-link fades, so a revised characteristic is selected to apply to the corrector means of the modulator so that the constellation parameters at the receiver are maintained substantially undistorted.

41. A method as claimed in claim 33 wherein the corrector means performs dynamic pre-correction by pre-distorting a signal which has been modulated to carry signals representative of digital data so as to reduce non-linear distortion in a signal channel containing root Nyquist bandpass filters in transmission and reception portions of said channel, there being provided a series connection of a static pre-distortion section configured to represent an inverse function of magnitude and phase distortion estimated to occur in said channel, and at least one dynamic pre-distortion section, the or each dynamic pre-distorting section including a forward model configured to represent magnitude and phase distortion in said channel, said signal being passed through cascaded sections whereby each successive dynamic pre-distorting section receives input from an output of a preceding dynamic pre-distorting section so that distortion in said channel is successively reduced to zero with each successive dynamic pre-distorting section.

42. A method as claimed in claim 41 wherein the satellite has a cascaded input multiplexer filter, a power amplifier and an output multiplexer filter, and said forward model comprises a model of magnitude response of said input multiplexer filter and output multiplexer filter, whereby magnitude response of said system may be corrected.

43. A method as claimed in claim 41 wherein said dynamic pre-distorting sections are substantially identical to one another.

44. A method as claimed in claim 41 wherein said forward model comprises a series connection of an up-sampler, a model representative of magnitude and phase of:

a transmission side root Nyquist filter;
a transmission side high power amplifier;
a satellite input multiplexer filter;
a satellite power amplifier;
a satellite output multiplexer filter;
a receiver side root Nyquist filter;
and a down-sampler.

45. A method as claimed in claim 42 wherein said power amplifier is one of a travelling wave and a solid state power amplifier.

46. A method as claimed in claim 33 wherein said signal is modulated in accordance with one of 16 QAM, 32 QAM, 8 PSK and 16 PSK.

47. A method as claimed in claim 33 wherein the received constellation pattern is displayed by a display means.

48. A satellite communication system to compensate up-link fade, said system including:

a modulator in a transmitting station,
an up-link to a satellite having a transponder not having a AGC,
a down-link from a beacon of the satellite to a receiving station having beacon receiver,
determining means to provide a plurality of characteristics representative of up-link fade values indicated by a signal transmitted from the beacon transmitter of the satellite to the receiving station beacon receiver,
storing means to store said plurality of characteristics to provide correction parameters for said modulator,
wherein said beacon receiver determines an up-link fade value and in dependence thereon selects a stored characteristic, and applies the selected characteristic to a corrector means of said modulator, and the modulation of a transmitted signal from the transmitting station is pre-corrected such that the signal received by the receiving station has a constellation pattern that is substantially undistorted by channel non-linearities and up-link fading.

49. A system as claimed in claim 48 wherein said determining means is to transmit a modulated signal from the satellite transponder when it is operating at its saturation point, detect a constellation pattern of the modulated signal received at the receiving station, determine and store the modulator correction parameters required to obtain a "corners at saturation" constellation pattern for the received signal, and repeat for various values of satellite transponder input back-off, which values correspond to values of up-link fade.

50. A system as claimed in claim 48 wherein said store means are coupled to the modulator at said transmitting station.

51. A method as claimed in claim 48 wherein said store means are at the receiving station which includes a satellite receiver demodulator coupled with display means for displaying the receiver constellation characteristics, and processor means for storing said plurality of characteristics and to select one of said characteristics for correcting said receiver constellation in dependence upon up-link fade, said processor means being coupled with said transmitter modulator to apply the pre-correction to the modulator to correct the received constellation parameters.

52. A system as claimed in claim 49 wherein the increments of satellite back-off are non-linear.

53. A method as claimed in claim 49 wherein the increments of satellite back-off are linear.

54. A system as claimed in claim 51 wherein the processor means is connected to said modulator by a digital communication channel.

55. A system as claimed in claim 48 wherein the beacon receiver means is polled such that, as the up-link fades, a revised characteristic is selected to be applied to the corrector means of the modulator so that the constellation parameters at the receiver are maintained substantially undistorted.

56. A system as claimed in claim 48 wherein the corrector means is to perform dynamic pre-correction by pre-distorting a signal which has been modulated to carry signals representative of digital data so as to reduce non-linear distortion in a signal channel containing root Nyquist band-pass filters in transmission and reception portions of said channel, there being provided a series connection of a static pre-distortion section configured to represent an inverse function of magnitude and phase distortion estimated to occur in said channel, and at least one dynamic pre-distortion section, the or each dynamic pre-distorting section including a forward model configured to represent magnitude and phase distortion in said channel, said signal being passed through cascaded sections whereby each successive dynamic pre-distorting section receives input from an output of a preceding dynamic pre-distorting section so that distortion in said channel is successively reduced to zero with each successive dynamic pre-distorting section.

57. A system as claimed in claim 56 wherein the satellite has a cascaded input multiplexer filter, a power amplifier and an output multiplexer filter, and said forward model comprises a model of magnitude response of said input multiplexer filter and output multiplexer filter, whereby magnitude response of said system may be corrected.

58. A system as claimed in claim 56 wherein said dynamic pre-distorting sections are substantially identical to one another.

59. A system as claimed in claim 56 wherein said forward model comprises a series connection of an up-sampler, a model representative of magnitude and phase of:

a transmission side root Nyquist filter;

a transmission side high power amplifier;

a satellite input multiplexer filter;

a satellite power amplifier;

a satellite output multiplexer filter, a receiver side root Nyquist filter, and a down-sampler.

60. A system as claimed in claim 57 wherein said power amplifier is one of a travelling wave and a solid state power amplifier.

61. A system as claimed in claim 48 wherein said signal is modulate in accordance with one of 16 QAM, 32 QAM, 8 PSK and 16 PSK.

62. A system as claimed in claim 48 wherein the received constellation pattern is displayed by a display means.

* * * * *